(12) United States Patent
Hayakawa et al.

(10) Patent No.: US 11,338,388 B2
(45) Date of Patent: May 24, 2022

(54) LASER KEYHOLE WELDING STRUCTURE OF ALUMINUM MATERIAL AND LASER KEYHOLE WELDING METHOD

(71) Applicant: NIPPON CHEMI-CON CORPORATION, Tokyo (JP)

(72) Inventors: Kazuhide Hayakawa, Tokyo (JP); Fumito Odashima, Tokyo (JP); Tatsuo Kubouchi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 251 days.

(21) Appl. No.: 16/497,154

(22) PCT Filed: Mar. 29, 2018

(86) PCT No.: PCT/JP2018/013276
§ 371 (c)(1),
(2) Date: Oct. 2, 2019

(87) PCT Pub. No.: WO2018/181724
PCT Pub. Date: Oct. 4, 2018

(65) Prior Publication Data
US 2020/0047282 A1    Feb. 13, 2020

(30) Foreign Application Priority Data

Mar. 31, 2017 (JP) .............................. JP2017-073033

(51) Int. Cl.
*B23K 26/06* (2014.01)
*B23K 26/24* (2014.01)
(Continued)

(52) U.S. Cl.
CPC ............ *B23K 26/067* (2013.01); *B23K 26/24* (2013.01); *B23K 26/32* (2013.01)

(58) Field of Classification Search
None
See application file for complete search history.

(56) References Cited

U.S. PATENT DOCUMENTS 5,478,983 A * 12/1995 Rancourt ............. B21D 19/005
219/121.63
7,760,771 B2   7/2010 Salokatve et al.
(Continued)

FOREIGN PATENT DOCUMENTS

JP    2005-254328    9/2005
JP    2008-511148    4/2008
(Continued)

OTHER PUBLICATIONS

Machine translation of Japan Patent No. 2012-130,946A, Sep. 2021 (Year: 2021).*

(Continued)

*Primary Examiner* — Geoffrey S Evans
(74) *Attorney, Agent, or Firm* — Nixon & Vanderhye

(57) ABSTRACT

Disclosed is a laser keyhole welding structure and a keyhole welding method of an aluminum material which stably suppress the generation of sputtering to ensure a reliable electrical connection and obtain a mechanically strong connection. To achieve this, a laser keyhole welding structure of an aluminum material is formed by welding an aluminum material element constituting an electronic component by irradiating a laser beam to the electronic component, in which a tapered portion spread angle (θ) of an upper portion of a welding nugget to be formed is 45° or less. Also disclosed is a laser keyhole welding structure of an aluminum material.

7 Claims, 13 Drawing Sheets

A: a bending point at which a straight line extending outward from the nugget bottom center first contacts
B: a bending point at which a straight line extending outward and upward from A
C: a foot of a perpendicular line from A to the nugget center line
D: an arbitrary point on a straight line extending outward from the straight line CA
E: a point on the outermost periphery of the uppermost surface of the nugget
G: value indicating the melt penetration depth
H: a value indicating the width of the nugget at a depth of G/2
L: a linear distance between the EPs, and is a width obtained by subtracting half the width of H from half the nugget width of the upper surface
θ: an acute angle formed between the straight line AB and the direct CD

(51) Int. Cl.
B23K 26/067 (2006.01)
B23K 26/32 (2014.01)

(56) References Cited

U.S. PATENT DOCUMENTS

| | | | |
|---|---|---|---|
| 2008/0025363 A1 | 1/2008 | Yla-Jarkko et al. | |
| 2015/0159243 A1* | 6/2015 | Shzuki | C22C 21/14 |
| | | | 420/548 |
| 2015/0183058 A1* | 7/2015 | Sugiyama | B23K 26/32 |
| | | | 219/121.64 |

FOREIGN PATENT DOCUMENTS

| | | | |
|---|---|---|---|
| JP | 2010-093178 | | 4/2010 |
| JP | 2012130946 A | * | 7/2012 |
| JP | 2015-022862 | | 2/2015 |
| JP | 2015-205327 | | 11/2015 |
| JP | 2016-209925 | | 12/2016 |

OTHER PUBLICATIONS

International Search Report, PCT/JP2018/013276, dated Jul. 3, 2018.

* cited by examiner

[Figure 1a]
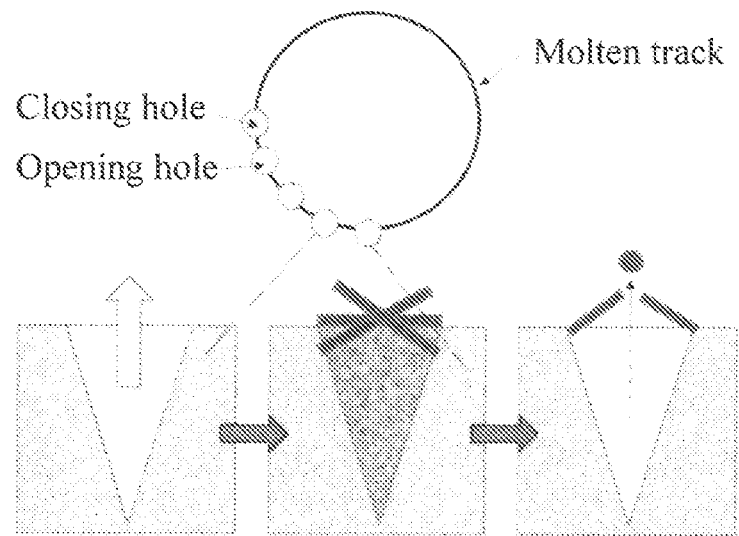
[Figure 1b]
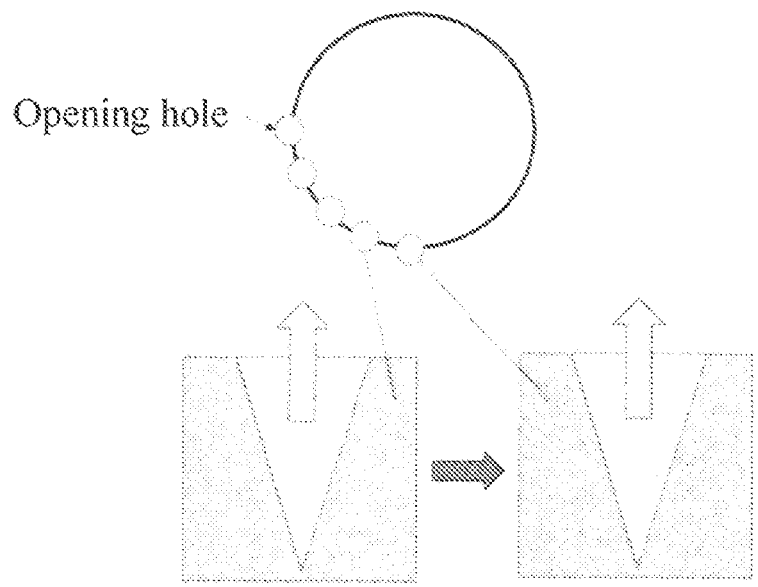
(b)

[Figure 3b]
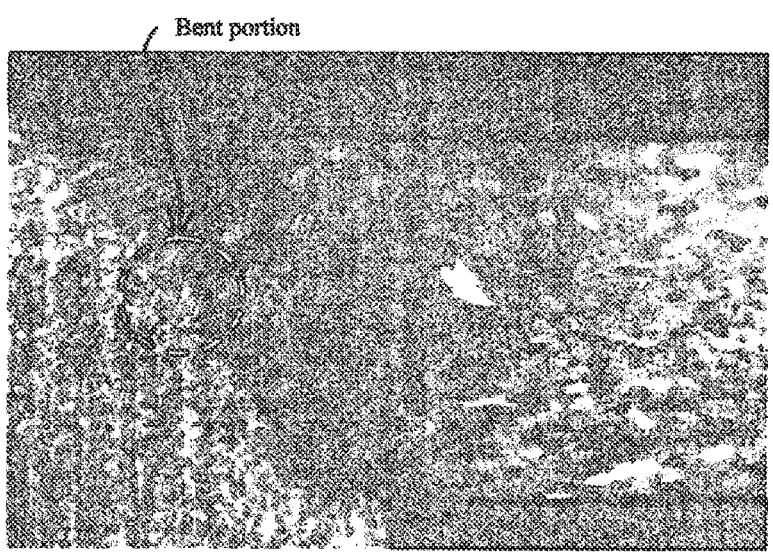
(b) Cross-section observation view

[Figure 4a]
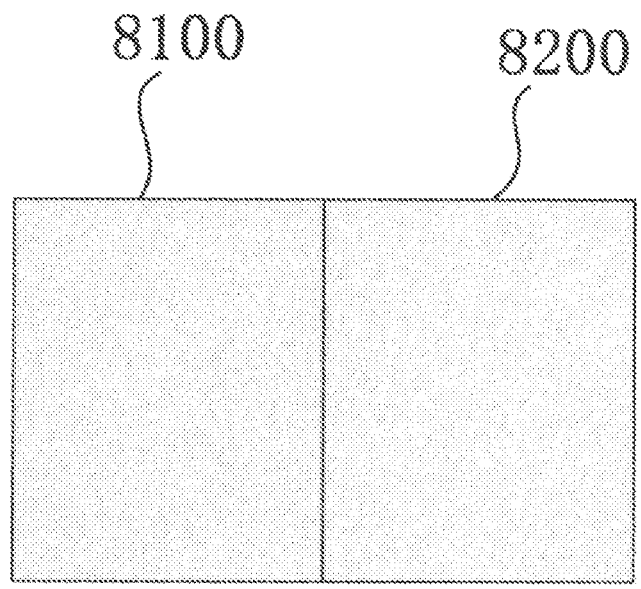
(a)

[Figure 4b]

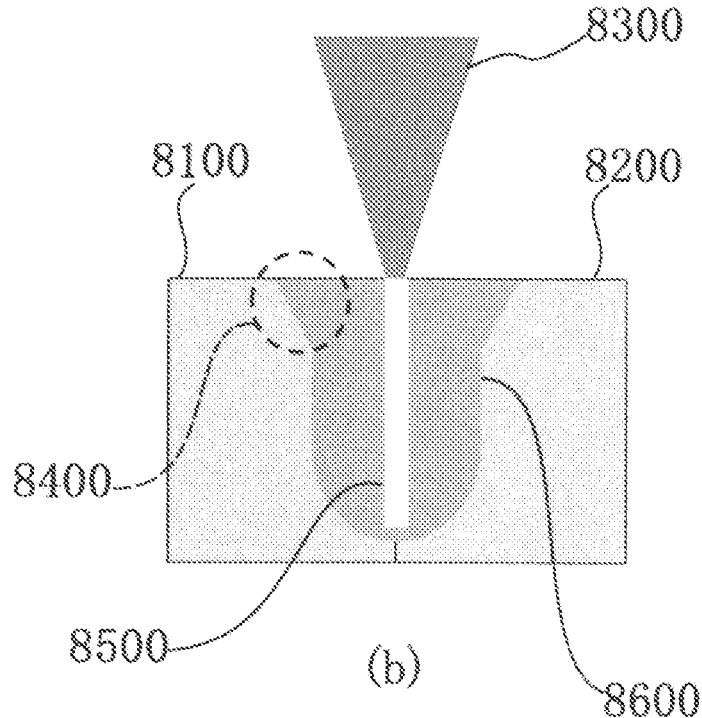

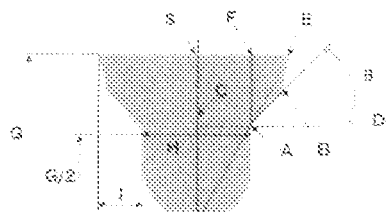

A : a bending point at which a straight line extending outward from the nugget bottom center first contacts
B : a bending point at which a straight line extending outward and upward from A
C : a foot of a perpendicular line from A to the nugget center line
D : an arbitrary point on a straight line extending outward from the straight line CA
E : a point on the outermost periphery of the uppermost surface of the nugget G : value indicating the melt penetration depth
H : a value indicating the width of the nugget at a depth of G/2
I : a linear distance between the EEs, and is a width obtained by subtracting half the width of H from half the nugget width of the upper surface
θ : an acute angle formed between the straight line AB and the direct CD

[Figure 6a]
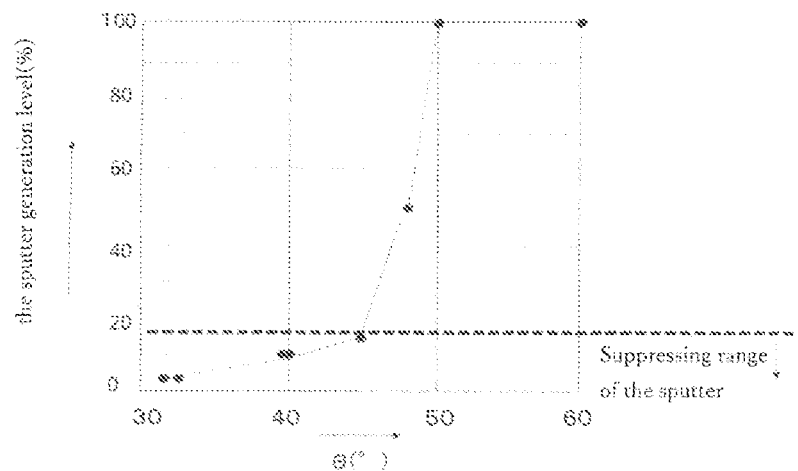
[Figure 6b]
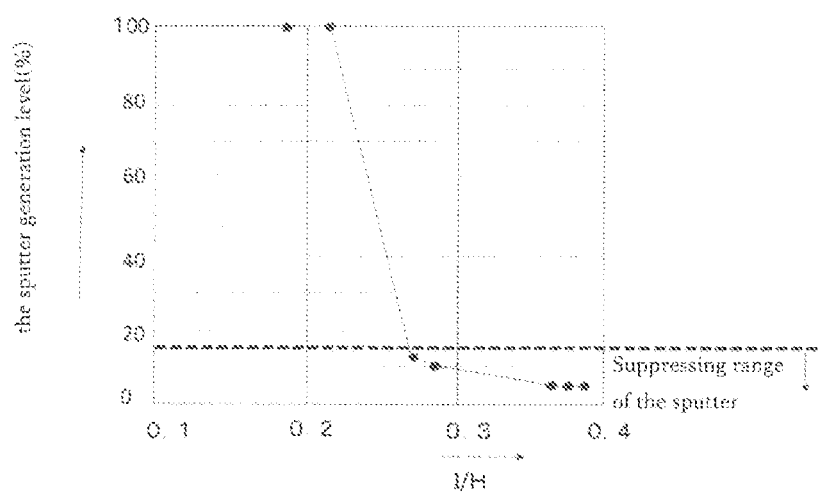

[Figure 7a]

(a) the prior art

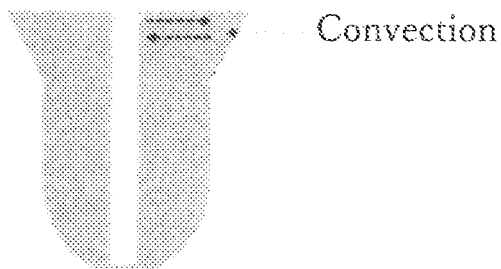 Convection the convection of the molten metal is generated from the inside to the outside, but the temperature gradient is not constant, so that there is also a case where the molten metal flows backward

⬇ the opening of the keyhole is blocked by the molten metal

⬇

The vapor gas inside the blocked keyhole blows off the blocked molten metal and is discharged to the outside

⬇

The blown molten metal is sputtered

[Figure 7b]

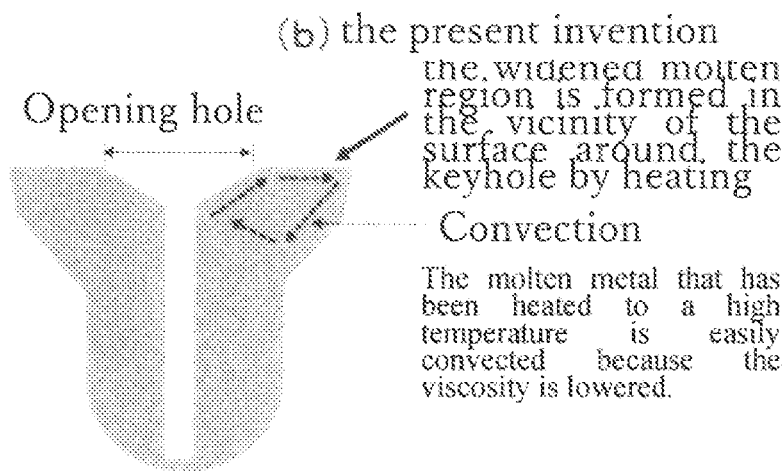

widening the outer edge portion of the molten region the temperature gradient (inner side is high and outer side is low) is stabilized, so that the molten metal is constantly convected from the inside to the outside.

the opening portion on the uppermost surface of the keyhole without being covered with the molten metal aluminum vapor in the keyhole is always discharged from the opening hole suppressing sputtering

[Figure 8a]
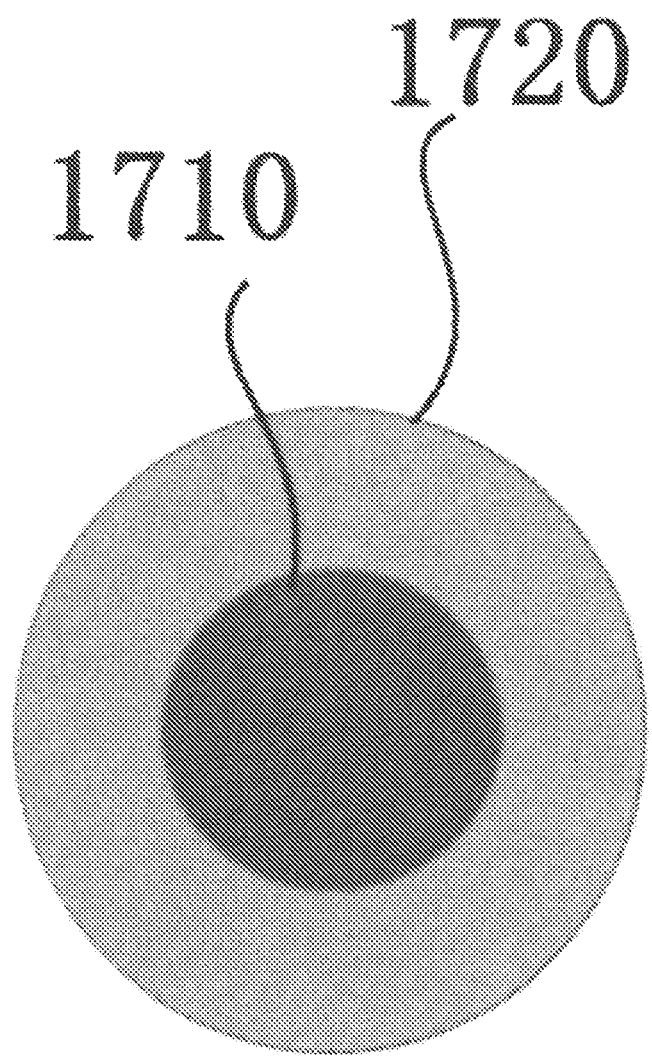

[Figure 8b]
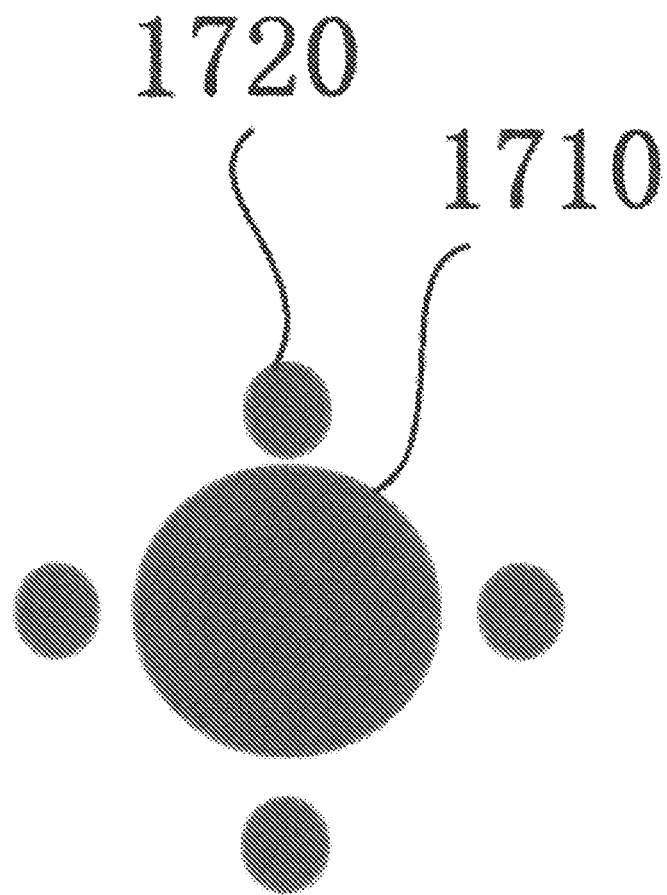

[Figure 8c]
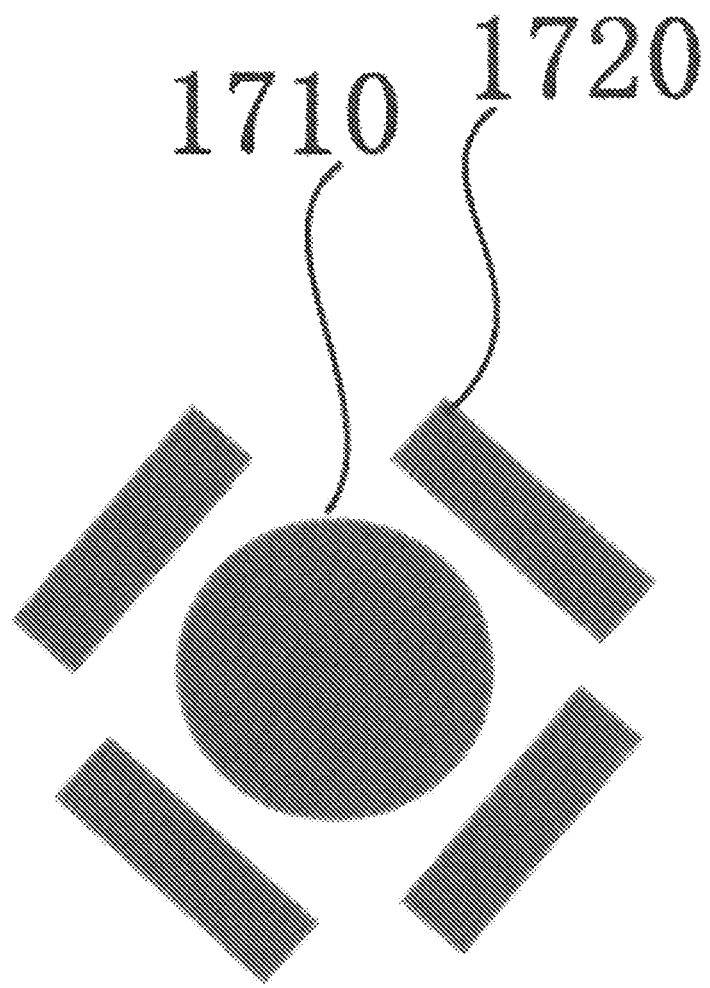

[Figure 8d]
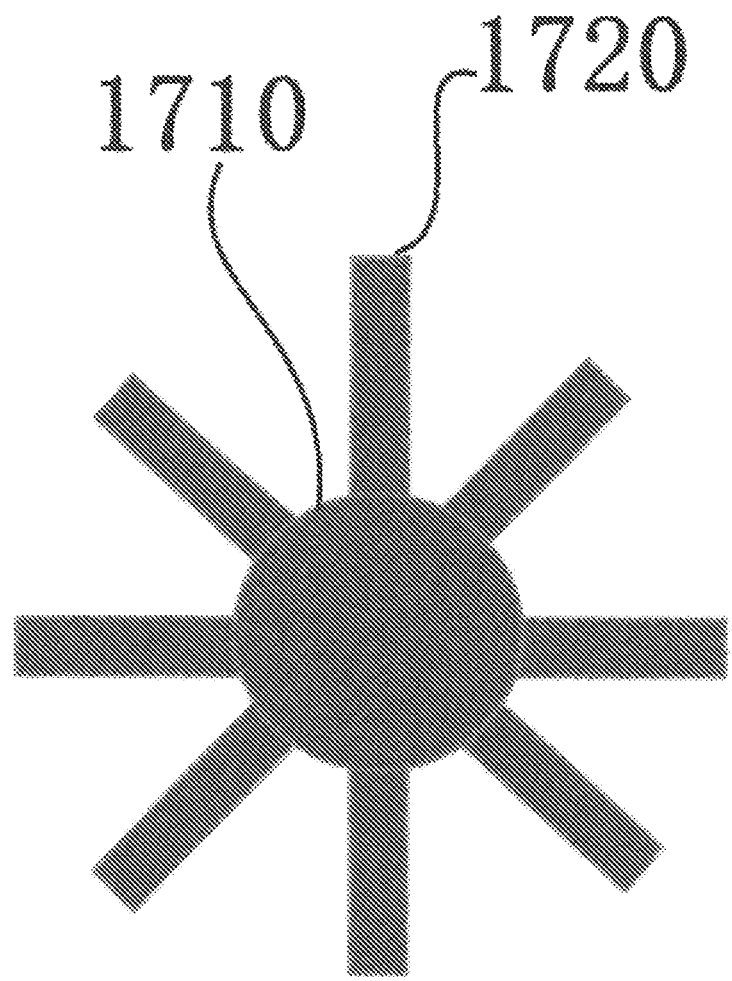

LASER KEYHOLE WELDING STRUCTURE OF ALUMINUM MATERIAL AND LASER KEYHOLE WELDING METHOD

KNOWN IN THE ART

The present invention relates to a laser keyhole welding structure of aluminum material and a laser keyhole welding method for reducing the generation of sputtering.

THE BACKGROUND ART

It is known that an electrolytic capacitor or an electric double layer capacitor undergoes a laser welding process in order to weld and electrically connect a capacitor element and an external terminal formed of an aluminum material. By the welding connection between the capacitor element and the aluminum material, it is possible to reduce the internal resistance of the element side by being electrically connected, and to reduce the contact resistance of the welding connection portion. In addition, when the electrolytic capacitors and the electric double layer capacitors are connected to each other by a bus bar, the contact resistance is reduced by welding connection using laser welding.

Regarding such electrical connection by laser welding, for example, it is described in Patent Document 1 that a configuration called end face current collection in which an end portion of a wound element and an extraction terminal having a flat surface are connected by welding is adopted in order to achieve low resistance inside an electrochemical capacitor, and it is also described that the contact area between the current collector and the extraction terminal can be widened from the configuration of the electrode terminal.

PRIOR-ART DOCUMENT

Patent Document

[Patent Document 1] Japanese Unexamined Patent Application Publication No. 2010-093178

SUMMARY OF THE INVENTION

Problems to be Solved by the Present Invention

Incidentally, in the vicinity of the laser light emission port of the laser welding apparatus, normally, in order to prevent dirt adhesion (dirt flying) caused by plume or sputtering containing vapor (gas) of metal or the like generated from the welding object or the like, a dirt-proof glass or the like which spatially partitions the laser emission port and the target workpiece is arranged.

However, with the lapse of time of laser welding, there has been found a phenomenon in which dirt-proof glass has a lenticular function or the like due to the soil gradually adhering to the dirt-proof glass, and as a result, a sufficient welding strength cannot be obtained. It is considered that such a phenomenon cannot be solved by simply moving the target workpiece on which the welding target is mounted in the Z-axis direction (laser beam irradiation direction) and focusing the target workpiece.

That is, it has been found that soiling of the dirt-proof glass not only causes a shift of focus, but also causes some laser light to be absorbed and scattered by the soiling, resulting in a reduction in the total laser light energy itself reaching the target workpiece.

The dirt-proof glass is periodically or irregularly replaced when a certain degree or more of soiling adheres or when the laser welding operation is performed for a certain time or more, but the use of the dirt-proof glass is continued even in a state in which it has a certain amount of soiling adherence until reaching the replacement threshold. Even in such a state, the laser welding apparatus is required to secure a desired welding strength safely and reliably.

As described above, the occurrence of contamination typically caused by the occurrence of sputtering causes various undesirable effects on the laser welding apparatus and the object to be welded, and may also lead to an unexpected defective phenomenon such as the occurrence of a short circuit between terminals. Therefore, at the time of laser welding, particularly in a mass production process, it is an extremely important problem how to stably suppress the generation of sputtering to ensure reliable electrical connection and to continuously obtain a mechanically strong connection.

The present invention has been made in view of the above problems, and an object thereof is to provide a laser keyhole welding structure and a laser keyhole welding method of an aluminum material, which can stably suppress the generation of sputtering to ensure reliable electrical connection and obtain a mechanically strong connection.

Means of Solving the Problems

The laser keyhole welding structure of the present invention is a laser keyhole welding structure of an aluminum material formed by irradiating a laser beam to the electronic component and welding an aluminum material element constituting an electronic component, the tapered portion spread angle (θ) of the upper portion of the welding nugget which is formed is characterized by a laser keyhole welding structure of an aluminum material of 45° or less.

Effect of the Invention

It is possible to provide a laser keyhole welding structure and a laser keyhole welding method of an aluminum material which stably suppress the generation of sputtering to ensure a reliable electrical connection and obtain a mechanically strong connection.

BRIEF DESCRIPTION OF THE DRAWINGS

FIG. 1 is a schematic diagram, which explains a conventional keyhole welding when sputtering occurs and the keyhole welding when sputtering according to the present invention does not occur based on the findings obtained from the observation result by the present inventor, (a) explains the conventional laser welding, (b) explains the laser welding according to the present invention.

FIG. 4 is a schematic diagram conceptually explaining the nugget shape of the cross section of the aluminum material after laser keyhole welding, (a) is a diagram for explaining the welding preparation state for butt-disposing the two aluminum material to be welded, (b) is a conceptual diagram for explaining the relationship between the shape of the formed keyhole and the molten pool above the keyhole.

FIG. 5 is a schematic view for explaining in more detail the cross-sectional shape of the welding nugget to exert the sputtering reducing effect of the present invention.

FIG. 6 is a graph explaining data which is the basis for deriving (Expression 1) and (Expression 2) shown in FIG. 5, (a) is a graph showing the relationship between the sputter generation level and θ, (b) is a graph showing the relationship between the sputter generation level and (I/H).

FIG. 7(a) is schematic diagrams for explaining sputter generation according to the prior art, and FIG. 7(b) is a schematic diagram for explaining sputter suppression according to the present invention.

FIG. 8 is an explanatory diagram illustrating a pattern variation of peripheral heating by satellite output light or the like.

BEST MODE FOR CARRYING OUT THE PRESENT INVENTION

Figure 2:
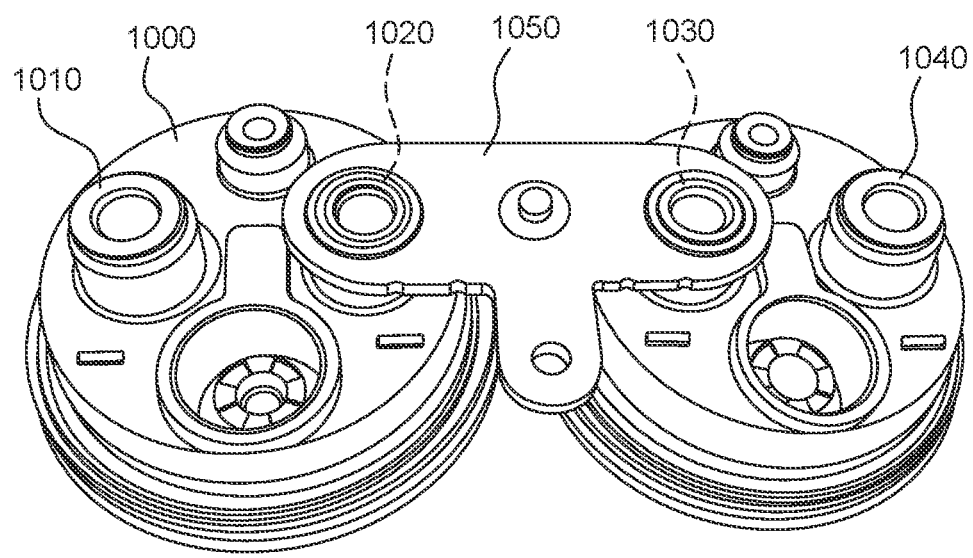
FIG. 2 is a diagram illustrating an aluminum electrode portion of a capacitor component to which the laser welding method of the present invention can be applied.

The laser keyhole welding method of the aluminum material described in the present embodiment can typically utilize a welding apparatus configured to appropriately separate one laser beam into a center output light and a satellite output light and output them. At the time of laser welding, the center output light forms a keyhole in the aluminum material which is the welding object and is melted to a deep portion, thereby contributing to firm welding.

In addition, at the time of laser welding, the satellite output light heats the periphery of the keyhole formed in the aluminum material which is the welding object and contributes to forming a molten pool which is relatively shallower and wider (larger area) than the keyhole around the keyhole.

The satellite output light can be output by separating the same laser light output from the same laser oscillator as the center output light into an arbitrary intensity ratio by an optical fiber, a diffraction element, an aspherical lens, or the like. For example, the core shape of the optical fiber may be a coaxial double core structure to separate the center output light and the satellite output light. Such a configuration is already known as disclosed in Japanese Patent Application Laid-Open No. 2008-511148, and will not be described in detail here.

Further, since the satellite output light has a function of forming a relatively shallow and wide molten pool by applying heat to the periphery of the keyhole formed by the center output light, the function may be replaced with another heating element (e.g., heating by halogen light or another heat source unit), by devising the shape and structure of the aluminum material to be welded, the heat obtained by the center output light may be quickly spread to the periphery, shallow and wide molten pool may be formed around the keyhole.

Further, it is preferable to adjust the output (energy density) of the laser light, the output ratio between the center output light and the satellite output light, and the welding speed (or the work speed) so that the tapered portion spread angle of the upper part of the keyhole of the formed welding nugget becomes 45° or less in the cross section of the aluminum material or the like after the laser welding.

The present inventors have found that the occurrence of sputtering is extremely reduced by such a configuration. Specifically, the inventors carefully observed the laser welding process, and according to the knowledge obtained by repeating the welding experiment and consideration, it was found that the generation of sputtering was caused by plume-like scattered matter scattered so as to protrude from a deep and narrow keyhole molten pool formed at the time of laser welding.

That is, a considerable amount of aluminum vapor (gas) is also generated in the keyhole at the time of laser welding, but since the keyhole melts in a relatively narrow range to a deep depth, the aluminum vapor is blocked inside a molten pool (typically a keyhole), and thereby aluminum vapor that has lost its field is generated by scattering in a bumping manner. For ease of understanding, it appears to be just like a water vapor explosion in a volcano.

Even if the aluminum vapor generated in the inside of the keyhole or in the deep portion, that is, in the narrow and deep molten pool is to be dissipated from the surface of the molten pool to the outside, the liquid aluminum of the molten pool covers the upper surface thereof, and is enclosed and blocked by the liquid aluminum or the like. It is believed that the generated aluminum vapor exerts a certain amount of force that tends to displace the liquid aluminum and dissipate it from the surface.

However, since the molten pool of the keyhole is deep and narrow, the space in the horizontal direction in which the displaced liquid aluminum is retreated is extremely limited, and therefore, the liquid aluminum is forced to retreat in the vertical direction due to rising upward or the like. However, at the next moment before the aluminum vapor is dissipated, the vertically rising liquid aluminum overlaps the aluminum vapor due to gravity due to the upwardly displaced reaction, and a blocked state is formed instantaneously. Then, the aluminum vapor and the surrounding liquid aluminum are explosively blown off so as to be boiled, and sputtering occurs.

FIG. 1 is a schematic diagram for explaining a comparison between conventional keyhole welding in the case where sputtering occurs and keyhole welding in the case where sputtering according to the present invention does not occur, based on the finding obtained from the observation result by the inventor of the present invention. FIG. 1(a) illustrates conventional laser welding and FIG. 1(b) illustrates laser welding according to the present invention.

As shown in FIG. 1A, conventionally, with the progress of the circular laser welding, a phenomenon in which opening holes for discharging metal vapor are formed or closed on the surface of the molten pool is almost alternately and irregularly repeated. That is, the keyhole formed at the time of laser welding is opened and closed in an unstable manner due to the fluctuation of the surrounding molten metal, and when closed, the surrounding molten metal is blown off so as to be bumped by the metal vapor pressure inside, thereby generating sputtering.

On the other hand, as shown in FIG. 1B, according to the laser welding method according to the present invention, the opening of the keyhole is always stably maintained during the progress of the circular laser welding, and the aluminum vapor is smoothly discharged without involving the molten metal in the molten pool. Although FIG. 1 illustrates a case where laser welding is performed in a circular shape, the shape of the welding progress is not limited to a circular shape.

For this reason, in order to suppress the generation of sputtering, it is important to enable a gas exhaust structure in which a considerable amount of aluminum vapor generated in the keyhole is smoothly discharged to the outside of the molten pool without being blocked inside the nugget to be formed during the laser welding process and to maintain it during the laser welding process.

On the other hand, in order to perform keyhole welding by forming a keyhole in an aluminum material, since a relatively high energy density is required, a laser beam is concentrated in a narrow range (for example, about 400 μm in diameter) and irradiated onto the aluminum material. Therefore, a molten pool (and nugget) having a relatively small area, a small diameter (for example, 1 mm or less), and a steep taper angle and a sharp depth in the depth direction is formed in the molten pool of the keyhole itself.

Since the weld pool of the keyhole having such a shape has a small surface area and a small width, the weld pool is always kept blocked by the molten aluminum during the laser welding as described above, and the path through which the aluminum vapor generated in the keyhole is discharged from the surface of the molten pool to the outside of the keyhole is broken. Then, the blocked aluminum vapor undergoes volumetric expansion due to heat, and explosively boils and scatters to the surroundings, resulting in generation of sputtering.

Therefore, in the laser keyhole welding method of the aluminum material according to the present embodiment, a method is proposed in which the aluminum material around the center output light for forming the keyhole is appropriately heated to increase the surface area of the molten pool at the time of laser welding, and laser welding is performed while maintaining the opening (the diameter and/or width of the molten pool) of the molten pool to be larger.

As a result, the evacuation place of the molten aluminum on the surface of the molten pool spreads in the horizontal direction, and an opening hole for discharging the aluminum vapor to the outside is easily formed on the surface of the molten pool corresponding to the keyhole and easily maintained. During the laser welding, aluminum vapor is always smoothly discharged to the outside from the opening holes formed at all times on the surface of the molten pool, thereby suppressing the occurrence of bumpy sputtering.

FIG. 2 is a diagram for explaining an aluminum electrode portion of a capacitor component (cell) to which the laser welding method of the present invention can be applied. As shown in FIG. 2, first terminals 1010 and 1030 and second terminals 1020 and 1040 are disposed on the upper surfaces of the sealing plates 1000 of the two capacitors, respectively. Laser keyhole welding is applied when the second terminal 1020 of the sealing plate 1000 of one capacitor and the first terminal 1030 of the sealing plate 1000 of the other capacitor are connected by the connection bus bar 1050.

Although FIG. 2 shows an example in which two sealing plates 1000 of capacitors are connected in series, 5 to 6 sealing plates may be connected in parallel or in series, or any number of sealing plates 1000 may be connected according to desired required characteristics.

Figure 3A:
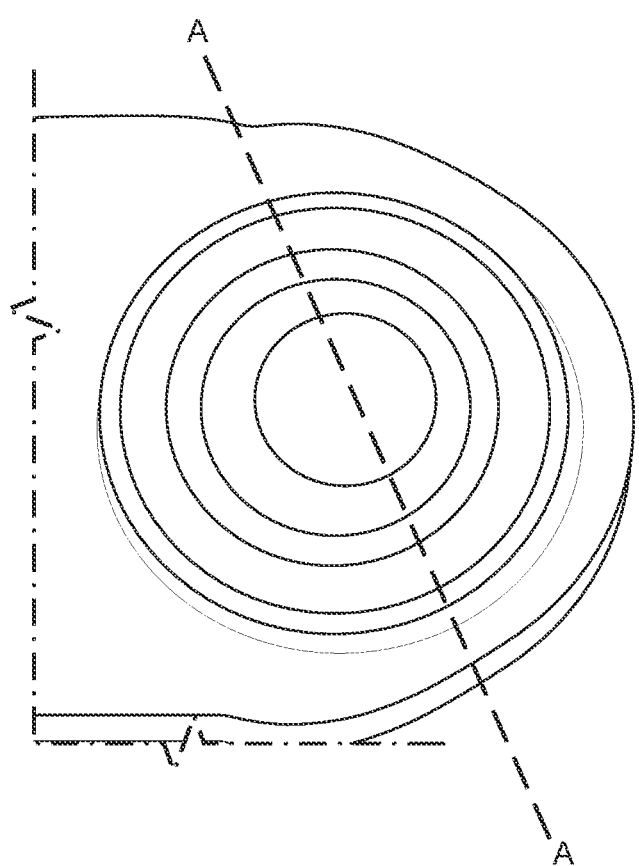
FIG. 3, (a) is a plane view for explaining the state of observing the laser mark of the connecting bus bar, (b) is a view showing the nugget shape of the A-A cross section when the laser welding mark shown in (a) is cut by a broken line portion.

Further, FIG. 3(a) is a plan view for explaining a state of observing the laser mark of the coupling bus bar, FIG. 3(b) is a view showing the nugget shape of the A-A cross section of the laser welding mark shown in FIG. 3(a) when it is cut by a broken line portion. In FIG. 3(b), the laser welding progresses from the front side of the paper to the back side of the paper.

As shown in FIG. 3B, in the laser keyhole welding in which sputtering is suppressed, in the nugget structure observed in cross section, a tapered portion having a further spread angle in a wine cup shape is formed above the keyhole. As a result, as shown in FIG. 3(b), a structure is provided in which a bent portion is provided at the boundary between the keyhole formed substantially vertically downward and the tapered portion having a further spreading angle in the form of a wine cup.

FIG. 4 is a schematic diagram conceptually illustrating a nugget shape of a cross section of an aluminum material after laser keyhole welding. FIG. 4A is a view for explaining a welding preparation state in which two aluminum materials 8100 and 8200 to be welded are butt-arranged, and FIG. 4B is a conceptual view for explaining a relationship between a shape of a keyhole 8500 which is formed and a shape of a molten pool above the keyhole 8500.

The aluminum materials 8100 and 8200 shown in FIG. 4A are all so-called A1000 aluminum materials, and are typically preferably A1050. It is considered that the aluminum material having high purity can relatively easily and faithfully express the action and effect of the present invention.

In FIG. 4(b) for explaining a state in which the laser beam 8300 is irradiated from above the paper surface of the aluminum materials 8100 and 8200 shown in FIG. 4(a) and laser welding is performed, the welding progress direction is from the front side to the back side of the paper surface or from the back side to the front side of the paper surface. The diameter of the keyhole 8500 is basically substantially equal to the diameter of the irradiation beam.

In the shape of the weld nugget 8600 shown in FIG. 4(b), there is a wine cup-shaped tapered extension 8400 above the deep and narrow keyhole 8500. When the laser welding process is performed so as to have such a nugget shape, the degree of freedom of movement of the molten aluminum in the molten pool is increased and the movement resistance is reduced under a certain condition in which the tapered portion 8400 is provided to be sufficiently wide, so that the gas vent hole is relatively easily formed and maintained to suppress sputtering.

FIG. 5 is a schematic diagram for explaining in more detail the cross-sectional shape of a welding nugget that exerts the sputtering reducing effect of the present invention. Since the shape of the welding nugget itself is difficult to observe in situ at the time of laser welding, laser welding with reduced sputtering can be actually performed by appropriately setting and adjusting the welding material, welding conditions, and the like so that laser keyhole welding can be performed so as to have a welding nugget shape as described in FIG. 5.

In FIG. 5, A denotes a first bending point at which a straight line extending outward from the nugget bottom center first contacts the side wall, B denotes a second bending point at which a straight line extending outward and upward from A contacts the side wall of the nugget separates from the side wall, and C denotes a foot of a perpendicular line from A to the nugget center line.

In FIG. 5, D is an arbitrary point on a straight line extending outward from the straight line CA, and E is a point on the outermost periphery of the uppermost surface of the nugget and corresponds to the outer edge of the surface of the molten pool. F is a foot of a vertical line vertically descending from A to the uppermost surface of the nugget, G is a distance between the uppermost surface and the bottom of the weld nugget, and is a value indicating the melt penetration depth, and H is a value indicating the width of the nugget at a depth of G/2. In addition, I indicates a linear distance between the EFs, and is a width obtained by subtracting half the width of H from half the nugget width of the upper surface. Further, θ represents an acute angle formed between the straight line AB and the direct CD. As a condition of the weld nugget shape which exerts an effect of suppressing sputtering, it is necessary to satisfy the condition that θ is 45° or less (Expression 1) and/or that I/H is 0.27 or more (Expression 2).

FIG. 6 is a diagram for explaining graphed data showing the basis for deriving (Expression 1) and (Expression 2) shown in FIG. 5. FIG. 6A is a graph showing the relationship between the sputter generation level and θ, and FIG. 6B is a graph showing the relationship between the sputter generation level and I/H. As can be understood from FIG. 6A, when θ is set to 45° or less, sputtering at the time of welding is obviously reduced. As can be understood from FIG. 6B, if the I/H is set to 0.27 or more, the sputtering at the time of welding is obviously reduced.

FIG. 7 is a diagram for explaining a sputter suppression mechanism estimated with respect to the mechanism of sputter suppression as shown in FIG. 6, in comparison with the related art. FIG. 7(a) is a diagram for explaining sputtering generation according to the prior art, and FIG. 7(b) is a diagram for explaining sputtering suppression according to the present invention. Although the validity of the mechanism described in FIG. 7 is expected to be further verified in the future, the inventor presumes that the mechanism shown in FIG. 7 is used at the present time, and therefore, the mechanism will be described first with reference to FIG. 7.

In the sputtering generation according to the prior art shown in FIG. 7A, the convection of the molten metal is generated from the inside to the outside, but the temperature gradient is not constant, so that there is also a case where the molten metal flows backward. As a result, the opening of the keyhole is blocked by the molten metal. The vapor gas inside the blocked keyhole blows off the blocked molten metal and is discharged to the outside. The blown molten metal is sputtered. Although the mechanism roughly as described above is presumed, it can be understood from the schematic diagram of FIG. 7A that the upper portion of the keyhole is easily blocked by the molten metal, and it is difficult to evacuate the molten metal in order to maintain the opening hole.

In addition, in the sputtering suppressing method according to the present invention shown in FIG. 7B, since the widened molten region is formed in the vicinity of the surface around the keyhole by heating, the surface area of the molten pool is increased when observed from above. For this reason, as shown in FIG. 7B, the opening is made large, and it is easy to secure the opening hole for venting the gas. As a result, the temperature gradient (inner side is high and outer side is low) is stabilized by widening the outer edge portion of the molten region, so that the molten metal is constantly convected from the inside to the outside. The molten metal that has been heated to a high temperature is easily convected because the viscosity is lowered. Therefore, it becomes easy to secure the opening portion on the uppermost surface of the keyhole without being covered with the molten metal, and aluminum vapor in the keyhole is always discharged from the opening hole, thereby suppressing sputtering.

The laser keyhole welding method of the aluminum material of the present embodiment is a laser keyhole welding method of an aluminum material for welding an aluminum material element constituting an electronic component by irradiating a laser beam to the electronic component, the laser beam has a beam profile composed of a center output light and a satellite output light formed around the center output light, the tapered portion spread angle of the upper portion of the formed welding nugget is characterized in that 45° or less.

As a result, as shown in FIG. 6A, it is possible to provide a laser keyhole welding method of an aluminum material which stably suppresses the generation of sputtering and ensures a reliable electrical connection, and also provides a mechanically strong connection. The center output light and the satellite output light formed around the center output light may be separated from each other by using an optical fiber cable having two coaxial waveguides. Further, the intensity ratio between the intensity of the center output light and the intensity of the satellite output light may be adjusted by adjusting the condenser lens or the like. Further, each light output may be acquired from a different light source and irradiated.

Also, the laser key hall welding method of the aluminum material of this embodiment, it is desirable that the ratio (I/H) between the difference (I) between the half value (ES) of the width of the surface of the welding nugget and the half value (H/2) of the welding nugget range (H) of the half value (G/2) of the depth of the entire welding nugget (G) and the welding nugget range (H) is more than 0.27.

As a result, as shown in FIG. 6B, it is possible to perform laser keyhole welding in which sputtering is clearly reduced. As shown in FIG. 5, the keyhole and the molten pool formed at the time of laser keyhole welding are solidified by subsequent cooling to form a weld nugget. The inventors of the present invention have conducted a detailed study to find that there is an indivisible relationship between the shape including the diameter of the weld nugget and the sputter generation. According to the obtained knowledge, as the difference (I) between the half value (ES) of the width of the surface of the weld nugget and the half value (H/2) of the width (H) of the weld nugget at half (G/2) of the depth (G) of the entire weld nugget becomes larger, that is, as the width of the molten pool surface becomes larger, sputtering is suppressed.

Further, the laser keyhole welding method of the aluminum material of the present embodiment is characterized in that the aluminum material is preferably a A1000 type (typically, A1050 of 99.5% pure aluminum) in which the AL component is a main component.

It has been found that the sputtering suppressing effect of the present invention is particularly remarkable in the electrode welding of an aluminum material having a relatively high purity as the material to be subjected to the laser keyhole welding. There is also a possibility that the cause of this may depend on the high thermal conductivity of aluminum and the low viscosity of the molten metal or its material properties, but no definite cause is known at this time. Further, in laser-welding of capacitor electrodes using A1050, extremely good sputter-suppressing effects have been confirmed.

Further, the laser keyhole welding method of the aluminum material of the present embodiment is further preferably characterized in that the center output light has a diameter of 100 to 500 μm and a power of 500 to 2000 W, and the satellite output light has a diameter of 200 to 800 μm and a power of 1000 to 3000 W.

Further, the laser keyhole welding method of the aluminum material of the present embodiment is further preferably characterized in that the welding speed of the laser keyhole welding is 1 to 10 m/min.

If the welding speed is too high, sufficient thermal energy necessary for welding cannot be given, and formation of a keyhole or a molten pool is not sufficient, leading to poor welding and increased sputtering. On the other hand, if the welding speed is too low, the applied thermal energy becomes too high, and the object may be damaged beyond the necessary welding limit. For this reason, it is considered that a speed of 1 to 10 m/min is most preferable as a typical example, although it is in balance with the laser output.

Further, the laser keyhole welding method of the aluminum material of the present embodiment is further preferably characterized in that the satellite output light is formed around the center output light in axial symmetry with respect to the center of the center output light.

Thereby, heat can be uniformly applied to the periphery of the center output light, and it is possible to form a molten pool which is balanced as a whole around the periphery of the center output light. Since the keyhole is formed at the portion irradiated with the center output light, a molten pool is formed around the keyhole with good balance, and when aluminum vapor is generated in the keyhole, the molten aluminum immediately above the keyhole avoid, and the vapor discharge hole can be easily formed and maintained. Here, FIG. 8 is an explanatory diagram illustrating a pattern variation of peripheral heating by satellite output light or the like. As shown in FIG. 8(a), the satellite output light may be arranged in a ring shape around the center output light, and various variations are conceivable, but the present invention is not limited to the heating shape shown in FIG. 8.

Further, the laser keyhole welding method of the aluminum material of the present embodiment is further preferably characterized in that the satellite output light is formed in a plurality of dot shapes around the center output light.

Typically, the shape is an irradiation light or the like of the pattern shown in FIG. 8(b), but the shape, size, total dot arrangement pattern, number, position, and the like of individual dots are not limited to this, and can be arbitrarily and optimally adjusted according to the characteristics of aluminum to be welded, laser welding characteristics, required quality characteristics, and the like. The output pattern of such dots can be appropriately adjusted using a diffractive element.

Further, the laser keyhole welding method of the aluminum material of the present embodiment is further preferably characterized in that the satellite output light is formed in a plurality of rectangular shapes around the center output light.

Typically, the shape is the irradiation light or the like of the pattern shown in FIG. 8(c), but not limited to this, the shape, size, length, arrangement pattern of the whole, the number and the position of each rectangle can be arbitrarily and optimally adjusted to the characteristics of the aluminum to be welded or the like.

Further, the laser keyhole welding method of the aluminum material of the present embodiment is further preferably characterized in that the satellite output light is radially formed around the center output light.

Typically, the shape is the irradiation light or the like of the pattern shown in FIG. 8(d), but the shape is not limited to this, and the individual radiation shape, size, length, overall arrangement pattern, number and position thereof can be arbitrarily and optimally adjusted to the characteristics of the aluminum to be welded or the like.

Further, the laser keyhole welding method of the aluminum material of the present embodiment is further preferably characterized in that the center output light and the satellite output light are formed by an aspherical lens or a diffractive element (DOE).

It may be realized by an optical system including a lens for converging or diverging laser light including linearly polarized light, a half-wave plate for continuously and arbitrarily changing the polarization direction of the laser light passing through the lens, and a birefringent element for dividing the laser light passing through the half-wave plate into two or more. In such an optical system, it is typically possible to arbitrarily change the irradiation pattern by rotating or changing the thickness of the birefringent element. In addition, the polarizing means may be arbitrarily configured so that a desired polarization effect is exhibited.

Further, the laser keyhole welding method of the aluminum material of the present embodiment is further preferably characterized in that instead of the satellite output light, the aluminum material around the center output light is heated by another heat source excluding the laser light, or that using the aluminum material in which the heat obtained by the center output light is rapidly diffused to the surroundings.

As described above, it is preferable to heat the periphery of the molten pool so that the surface area of the molten pool formed around the keyhole at the time of laser welding is further increased. As a method and means of such heating, it is also possible to heat by laser light (i.e., satellite output light), and it is also possible to use a halogen lamp, an infrared lamp, or any other heating element as another light source. Even when the satellite output light is used, it is not limited to the same output light from the same laser oscillator as the center output light, and light obtained from a separate laser oscillator may be used. Further, the aluminum shape and thickness may be such that the heat generated by the center output light is rapidly diffused around the center output light, and they may be appropriately combined and used in combination.

Further, the laser keyhole welding method of the aluminum material of the present embodiment is further preferably characterized in that at least a part of the surface of the molten pool is always in an open state so that the generated aluminum vapor is not blocked in the welding nugget during the laser welding.

By adopting such a welding method, the generated aluminum gas is quickly and smoothly discharged from the opening hole of the surface of the molten pool, so that the generation of sputtering due to explosive burst boiling is largely suppressed. The suppression mechanism was found by careful experiment and observation by the present inventor, and is explained in FIG. 1, FIG. 7, and the like.

Further, the method of producing a welded product of the present embodiment is a method of producing a welded product by laser keyhole welding, wherein in the welded nugget formed by welding, the spread taper angle ($\theta$) just above the nugget corresponding to the keyhole is 45° or less.

As a result, since the molten pool spreads largely above the keyhole, the avoidance place of the molten aluminum becomes large and easy to avoid, and the opening hole for venting gas is easily formed and maintained, thereby suppressing sputtering. As shown in FIG. 6A, a clear sputter suppression effect was observed at 45° or less. Since the shape and size of the keyhole and the weld pool formed at the time of laser welding can be confirmed as the nugget shape by subsequent cross-sectional observation, it is possible to determine from the nugget shape at a later date whether or not sputtering was sufficiently suppressed at the time of welding.

Further, the method for producing a welded product of the present embodiment is preferably characterized in that the ratio (I/H) between the difference (I) between the half value (ES) of the width of the surface of the weld nugget and the half value (H/2) of the width (H) of the weld nugget at half (G/2) of the depth (G) of the entire weld nugget and the width (H) of the weld nugget is 0.27 or more.

As a result, since the molten pool spreads largely above the keyhole, the avoidance place of the molten aluminum becomes large and easy to avoid, and the opening hole for venting gas is easily formed and maintained, thereby suppressing sputtering. As shown in FIG. 6B, when (I/H) was 0.27 or more, a clear sputtering suppressing effect was observed.

The laser welding method for electronic components of the present invention is not limited to the configuration and the laser welding method described in the above embodiments, and the welding method can be changed by appropriately changing the configuration within the scope obvious to a skill in art and within the scope of the technical idea of the present invention.

INDUSTRIAL APPLICABILITY

The present invention is a laser welding apparatus for electronic components, and is suitable for laser keyhole welding of electrode terminals typically made of aluminum.

DESCRIPTION OF SYMBOLS

1000 . . . capacitor sealing plate, 1010 . . . first terminal, 1020 . . . second terminal, 1050 . . . connection bus bar.

The invention claimed is:

1. A laser keyhole welding structure of an aluminum material for welding an aluminum material element constituting an electronic component by irradiating a laser beam to the electronic component, wherein,
   an angle of divergence ($\theta$) of a tapered portion of an upper portion of a weld nugget to be formed is 45° or less,
   a ratio (I/H) between i) a difference (I) between a half value (ES) of a width of an upper surface of the welding nugget in a cross-sectional shape and a half value (H/2) of a width (H) of the welding nugget in half (G/2) at a total depth (G) of the welding nugget, and ii) the width (H) of the welding nugget is 0.27 or more,
   a laser light has a beam profile composed of a center output light and a satellite output light formed around the center output light, and
   the satellite output light is axially symmetrically formed about the center output light with respect to a center of the center output light.

2. The laser keyhole welding structure of the aluminum material according to claim 1, wherein the aluminum material is a A1000 system mainly composed of A1000 alloy.

3. A laser keyhole welding method of an aluminum material for welding an aluminum material element constituting an electronic component by irradiating a laser beam to the electronic component, wherein,
   a laser light has a beam profile composed of a center output light and a satellite output light formed around the center output light, and
   an angle of divergence ($\theta$) of a tapered portion of an upper portion of a weld nugget to be formed is 45° or less,
   a ratio (I/H) between i) a difference (I) between a half value (ES) of a width of an upper surface of the welding nugget in a cross-sectional shape and a half value (H/2) of a width (H) of the welding nugget in half (G/2) at a total depth (G) of the welding nugget, and ii) the width (H) of the welding nugget is 0.27 or more,
   the satellite output light is axially symmetrically formed about the center output light with respect to a center of the center output light, and
   the satellite output light is formed in a plurality of dot shapes around the center output light.

4. The method of laser keyhole welding of aluminum material according to claim 3, wherein,
   the satellite output light is formed in a plurality of rectangular shapes around the center output light.

5. The method of laser keyhole welding of aluminum material according to claim 3, wherein the center output light and the satellite output light are formed by an aspherical lens or a diffractive element (DOE).

6. The method of laser keyhole welding of aluminum material according to claim 3, wherein during laser welding, a surface of a molten pool is always at least partially open so that a generated aluminum vapor is not blocked in the welding nugget.

7. A laser keyhole welding method of an aluminum material for welding an aluminum material element constituting an electronic component by irradiating a laser beam to the electronic component, wherein,
   a laser light has a beam profile composed of a center output light and a satellite output light formed around the center output light,
   an angle of divergence ($\theta$) of a tapered portion of an upper portion of a weld nugget to be formed is 45° or less,
   a ratio (I/H) between i) a difference (I) between a half value (ES) of a width of an upper surface of the welding nugget in a cross-sectional shape and a half value (H/2) of a width (H) of the welding nugget in half (G/2) of a total depth (G) of the welding nugget, and ii) the width (H) of the welding nugget is 0.27 or more, and
   the satellite output light is radially formed around the center output light.

\* \* \* \* \*